US00RE39453E

(19) United States
(12) Reissued Patent
Boytor et al.

(10) Patent Number: US RE39,453 E
(45) Date of Reissued Patent: Jan. 2, 2007

(54) LOW PROFILE INDUCTIVE COMPONENT

(75) Inventors: James G. Boytor, Oakwood Hills, IL (US); Catalin C. Girbaci, Crystal Lake, IL (US); Helen O. Gogny, McHenry, IL (US)

(73) Assignee: Coilcraft, Incorporated, Cary, IL (US)

(21) Appl. No.: 10/653,583

(22) Filed: Sep. 2, 2003

Related U.S. Patent Documents

Reissue of:
(64) Patent No.: 6,285,272
Issued: Sep. 4, 2001
Appl. No.: 09/428,904
Filed: Oct. 28, 1999

(51) Int. Cl.
*H01F 27/02* (2006.01)
*H01F 27/30* (2006.01)

(52) U.S. Cl. ..... 336/83; 336/192; 336/185; 336/90; 29/602.1

(58) Field of Classification Search ..... 336/200, 336/223, 83, 185, 90, 183; 29/602.1, 605, 29/606
See application file for complete search history.

(56) References Cited

U.S. PATENT DOCUMENTS

| | | | | |
|---|---|---|---|---|
| 2,850,707 | A | | 9/1958 | Wroblewski et al. |
| 2,962,679 | A | | 11/1960 | Stratton |
| 2,976,502 | A | | 3/1961 | Hill |
| 3,663,913 | A | | 5/1972 | Kato et al. |
| 3,735,214 | A | | 5/1973 | Renskers et al. |
| 4,498,067 | A | | 2/1985 | Kumokawa et al. |
| 4,717,901 | A | | 1/1988 | Autenrieth et al. |
| 4,725,806 | A | * | 2/1988 | Chamberlin ..... 336/192 |
| 4,757,610 | A | | 7/1988 | McElheny et al. |
| 4,801,912 | A | | 1/1989 | McElheny et al. |
| 4,914,804 | A | | 4/1990 | McElheny et al. |
| 4,926,151 | A | * | 5/1990 | Morinaga |

(Continued)

FOREIGN PATENT DOCUMENTS

| | | | | |
|---|---|---|---|---|
| GB | 2 154 374 | A | | 9/1985 |
| JP | 58-184815 | | | 12/1983 |
| JP | 0543513 | | | 6/1993 |
| JP | 7-074028 | | | 3/1995 |
| JP | 07-094342 | | | 4/1995 |
| JP | 7-288210 | | | 10/1995 |
| JP | 2567186 | | | 12/1997 |
| JP | 10022138 | | | 1/1998 |
| JP | 410022137 | A | * | 1/1998 |
| JP | 10294221 | | | 11/1998 |
| JP | 1032670 | | | 12/1998 |
| JP | 11-54345 | | | 2/1999 |
| KR | 2001-0045690 | | | 6/2001 |
| WO | WO 92/05568 | | | 4/1992 |

OTHER PUBLICATIONS

Total Catalog 1993 of Sagami Elec. Co., Ltd., 12pp. (Oct. 13, 1992).

*Promotional Literature*, Sumida Electric Co., Ltd., Model CDRH125, 3pp. (1997).

*Selection for Fixed Inductors*, Model No. D63LCB, Toko America, Inc., 5pp. (1998).

*1999 Catalog*, Toko America, Inc., 3pp., (1998).

*Primary Examiner*—Anh Mai
(74) *Attorney, Agent, or Firm*—Fitch, Even, Tabin & Flannery

(57) ABSTRACT

A low profile inductive component in accordance with the disclosure set forth here comprises a low profile body having spread apart soldering pads for electrically and mechanically attaching the structure to a printed circuit board and defining an aperture between the pads. A magnetic core is disposed in the aperture. A wire is wound around the core having a first and second end connected to the pads. One end of the core is disposed in the aperture of the low profile body and its other end, which is larger than the aperture, is spaced from the body by spacers extending from the body.

55 Claims, 2 Drawing Sheets

U.S. PATENT DOCUMENTS 4,934,048 A 6/1990 McElheny et al.
5,307,041 A 4/1994 Kato et al.
5,359,313 A * 10/1994 Watanabe et al. ..... 336/178
5,363,080 A 11/1994 Breen
5,398,400 A 3/1995 Breen
5,541,567 A * 7/1996 Fogel et al.
5,572,180 A 11/1996 Huang et al.
5,598,136 A 1/1997 Kano et al.
5,751,203 A * 5/1998 Tsutsumi et al. ..... 336/65
5,760,669 A * 6/1998 Dangler et al.
5,789,712 A 8/1998 Barry et al.
5,796,324 A * 8/1998 Ross et al.
5,804,952 A 9/1998 Chen
5,831,331 A 11/1998 Lee
5,867,891 A 2/1999 Lampe, Jr. et al.
5,877,666 A 3/1999 Johnson, Jr. et al.
5,896,077 A 4/1999 Cadwallader
5,900,797 A 5/1999 Dougauchi
5,903,207 A 5/1999 Lampe, Jr. et al.
5,936,504 A * 8/1999 Hatakenaka ..... 336/200
6,205,647 B1 3/2001 Cadwallader

* cited by examiner

LOW PROFILE INDUCTIVE COMPONENT

Matter enclosed in heavy brackets [ ] appears in the original patent but forms no part of this reissue specification; matter printed in italics indicates the additions made by reissue.

FIELD OF THE INVENTION

This invention relates generally to electronic components, and more particularly concerns low profile surface mountable inductive components.

BACKGROUND

The electronics industry is continually called upon to make products smaller and more powerful. Applications such as mobile phones, portable computers, computer accessories, hand-held electronics, etc., create a large demand for smaller electrical components. These applications further drive technology to research new areas and ideas with respect to miniaturizing electronics. Often times, applications specifically require "low profile" components due to constraints in height and width. Unfortunately, the technology is often limited due to the inability to make certain components smaller, faster, or more powerful. Nowhere can this be seen more than in the struggle to manufacture smaller electrical circuits.

Originally, components were mounted on a printed circuit board (PCB) by inserting the leads of the component through the PCB and soldering them to solder pads on the opposite side of the PCB, (called through-hole technology). This technique left half of the PCB unpopulated because one side had to be reserved for solder pads and solder. Therefore, in order to fit more components in a particular circuit, the PCBs were made larger, or additional PCBs were required.

The solution to this problem came in the form of Surface-Mount Devices (SMD), or Surface-Mount Technology. SMDs allow electrical components to be mounted on one side of a PCB, (i.e., without having the leads inserted through-holes). An SMD device has small solder pads (or leads) connected to its body, which correspond to solder pads or lands placed on the surface of the PCB. Typically the PCB is run through a solder-paste machine (or screen printer), which puts a small amount of solder on the solder pads on the PCB. Next, a glue dot is inserted on the PCB where the component is to rest. Then, the component is placed on the PCB (held by the glue dot), and the PCB is sent through a re-flow oven to heat the solder paste and solder the component leads to the PCB solder pads. The primary advantage to this technique is that both sides of the PCB can now be populated by electronic components. Meaning one PCB today can hold an amount of electrical components equal to two PCBs in the past.

As a result of this advancement in technology, the current electronic circuits are mainly limited by the size of components used on the PCB. Meaning, if the electronic components are made smaller, the circuits are smaller as well. Unfortunately, there are some electronic components that can simply not be produced any smaller than they currently are. Usually this is because the desired parameters for the component cannot be achieved when using smaller parts. A good example of this is inductive components. Inductive components are often used in stepper motors, transformers, servos, relays, inductors, antennas, etc. Typical applications requiring such components include radio frequency (RF), switching power supplies, converters, data communications, processor/controller circuits, signal conditioning circuits, biasing oscillators, DC-DC converters, DC-AC converters, chokes, IC inverters, filters, etc. Certain parameters of these components are affected by the size of parts used. For instance, in inductors, wire gauge determines both the DC resistance and the current carrying ability of the component.

Several attempts have been made to compensate for components requiring a minimum amount of size in order to use them in smaller circuit applications. For example, U.S. Pat. No. 5,760,669, issued Jun. 2, 1998, to Dangler et al., discloses a low profile inductor/transformer component having a wire coil within a core set which is disposed at least partially within a recess in a header. To achieve its low profile status, Dangler uses a header with a plurality of projections extending from the header's side. A core set is disposed within the header and a pre-wound coil is inserted around the core set. At least one end of the pre-wound coil is wrapped around at least one of the header projections, thereby increasing the size of the coil without raising the height of the component. Unfortunately, this structure creates an awkward sized component with exposed conductive wires capable of being damaged. In addition, the need for pre-wound coils, upper and lower core attachments (the core set), and a header having projections is costly and takes up valuable space on the PCB. Such a device does not answer the growing need for smaller components.

Another attempt to produce low profile surface mount coil assemblies is disclosed in U.S. Pat. No. 5,796,324, issued Aug. 18, 1998, to Ross et al. Ross discloses a coil wound bobbin having posts that are capable of suspending the coil either above or alongside a PCB. The ends of the coil wire are wrapped on the posts to form wire terminations. These posts are the only part of the component that need to be soldered to the PCB. Unfortunately, suspending the coil above or alongside the PCB does not reduce the amount of space required for the circuit as a whole. Suspending the wire above the board simply raises the height of the circuit. Suspending the coil alongside the PCB raises the width requirement for the circuit.

Accordingly, it has been determined that the need exists for an improved low profile inductive component which overcomes the aforementioned limitations and which further provides capabilities, features and functions, not available in current devices.

SUMMARY OF THE INVENTION

A low profile inductive component in accordance with the invention comprises a low profile body having spread apart soldering pads for electrically and mechanically attaching the body to a printed circuit board. The body defines an aperture between the pads. A core is disposed in the aperture. A wire is wound around the core and has first and second ends connected to the soldering pads. The core has integral flange ends, with the upper flange being smaller than a lower flange. The body has spacers on its lower surface which bear against the lower flange to retain the core such that it does not fully pass through the aperture of the body. This structure allows for the upper flange to be disposed in the aperture of the body with the lower flange abutting the spacer so as to position the flange above the plane of the solder pads.

In another embodiment, the body is constructed such that the lower flange of the core extends beyond the solder pads so that when mounted on a printed circuit board the lower flange extends into an aperture in the PCB. With such a construction, the height of the inductive component above the board will be lower than the height of the prior described embodiment.

An advantage to using this component is that the wire wound around the core is not exposed and the inductive component takes on a slim wafer shape, making it ideal for low profile applications. A further advantage is that the component retains a traditional shape and has no awkward protruding members, thereby making it suitable for vacuum placement surface mount applications, for densely populated PCBs, and/or applications requiring components that use a minimal amount of space.

BRIEF DESCRIPTION OF THE DRAWINGS

Other objects and advantages of the invention will become apparent upon reading the following detailed description and upon reference to the drawings, in which.

DETAILED DESCRIPTION OF THE INVENTION

Figure 1:
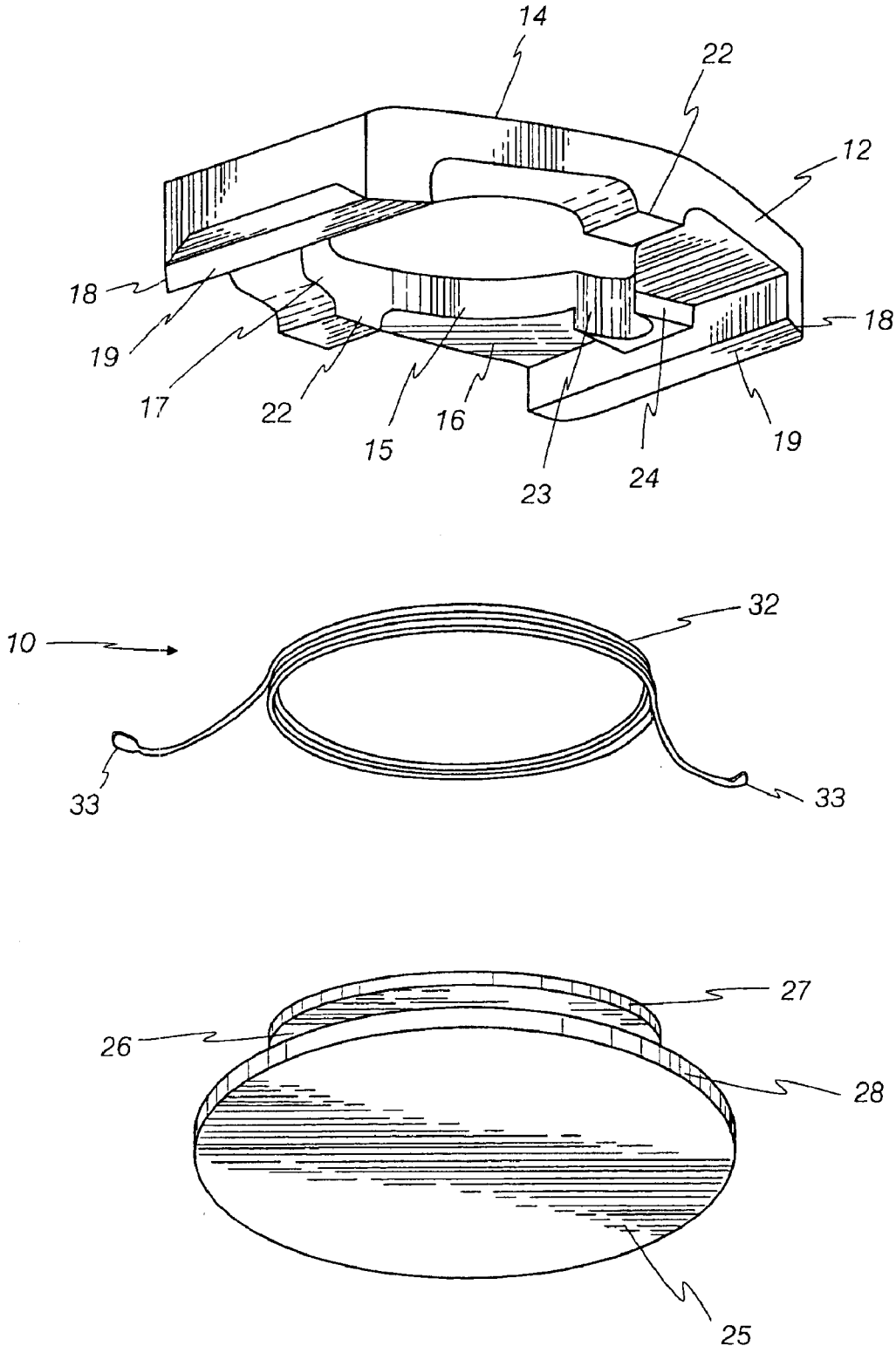
FIG. 1 is an exploded view of a low profile inductive component according to the invention.
Figure 2:
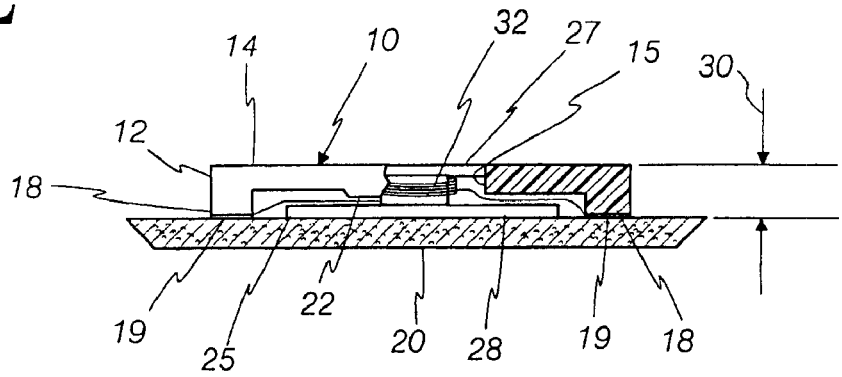
FIG. 2 is a profile view, partially in a cross-section, of the component shown in FIG. 1 mounted on a printed circuit board.

Turning first to FIGS. 1 and 2, a low profile inductive component in accordance with the invention for mounting above the printed circuit board (PCB) is shown generally at reference numeral 10. For convenience, the inductive component is described as it would be positioned on the upper surface of a PCB.

In FIGS. 1 and 2, the low profile inductive component 10 includes a low profile body 12 made of an insulating material, such as a non-conductive plastic or ceramic. The body 12 has a polygonal shape, such as a hexagon, and is defined by a smooth planer top 14 and a bottom 16. The body 12 defines an aperture 15 passing directly through the center of the top 14 and the bottom 16, and having an inner wall 17.

A pair of legs 18 extend downward from opposite ends of the body 12. Soldering pads 19 are located at the bottom of the legs 18, which are made of a conductive material, such as metal, for electrically and mechanically attaching the low profile inductive component 10 to a PCB 20. As is depicted in FIG. 1, each soldering pad 19 is L-shaped and covers the bottom of the associated leg 18 and a part of its outer side. This configuration allows for the inductive component 10 to be removed with a standard soldering iron.

The bottom 16 of the body also includes a pair of integrated spacers 22 extending downwards from the body 12 adjacent the aperture in a plane perpendicular to the planes containing the legs 18.

The inner wall 17 of the aperture 15 includes a pair of opposed recesses 23, which are generally arched-shaped and extend perpendicular to the planes containing the legs 18. The bottom 16 of the body 12 extends down around the perimeter of each recess 23, thereby creating a recess-shaped spacer 24. The recesses 23 aid in the positioning of the inductive component 10 on the PCB 20.

The low profile inductive component 10 further includes a core 25 of magnetic material, such as ferrites, having a cylindrical center section 26 with an upper flange 27 on the upper end of the center section 26 and a larger diameter lower flange 28 on the lower end of the center section 26. The core 25 is disposed in the aperture 15 with the upper flange 27 fitting snugly in the aperture 15 and with upper surface of the lower flange abutting the spacers 22 and 24. The core 25 may be affixed to the spacers 22 and 24 by a suitable glue. The spacers 22 and 24, and the core 25 are sized so that the top of the upper flange 27 is about even with the top surface 14 of the body 12 and the lower surface of the lower flange is in about the same plane as the solder pads 18. In other words, the core 25 fits completely within the body 12.

The inductive component 10 also includes an insulated electric wire 32, such as twenty-four gage copper wire, wound around the center section of the core 14 and having ends 33 connected to the bottom of the soldering pads 19. The ends 33 therefor are press fit against the soldering pads 19 to ensure that the ends will be soldered to the lands on the PCB 20.

The height of the component 10, as indicated in FIG. 2 with the reference numeral 30, when mounted on the PCB 20 is less than about 1.65 mm above the PCB 20.

Figure 3A:
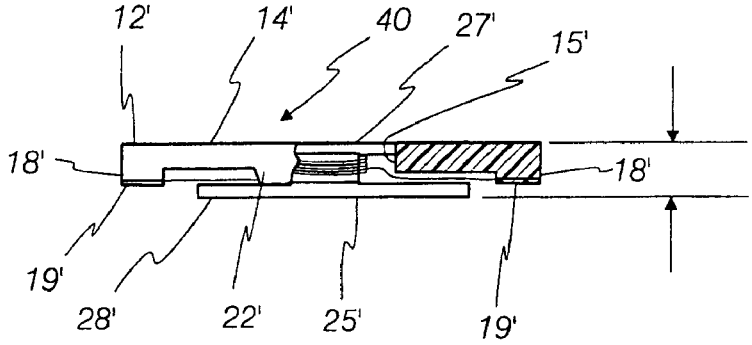
FIG. 3a is a profile view, partially in a cross-section, of another embodiment of a low profile inductive component according to the invention mounted on a printed circuit board.
Figure 3B:
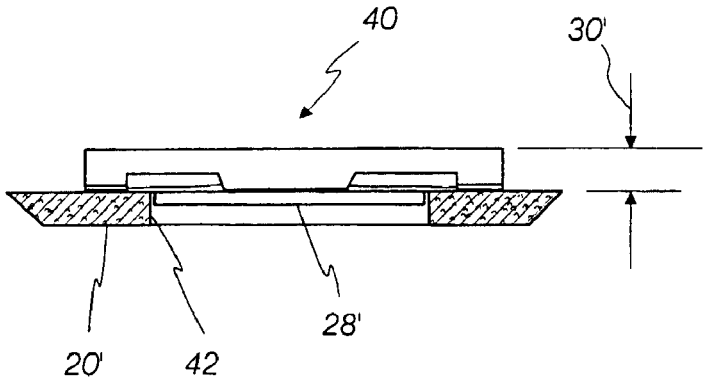
FIG. 3b is a profile view of the component shown in FIG. 3a mounted on a printed circuit board.

In FIGS. 3a–b, a low profile inductive component for mounting partially in the PCB is shown generally at reference numeral 40. This component is similar to the component shown in FIGS. 1 and 2, and the similar parts are identified with the same reference numeral with exponent "'".

In this embodiment, the legs 18' of the body 12' are made shorter so that the lower flange 28' extends below the plane of the solder pads 19'. As shown in FIG. 3b, the printed circuit board 20 is provided with an aperture 42 that is larger than the diameter of the lower flange 28'. The aperture 42 is positioned between the lands on the PCB so that when the component 40 is mounted on the PCB, the lower flange 28' extends into the aperture.

The height of the component when mounted in the PCB is less than the component of FIGS. 1 and 2. Its height 30' is less than about 1.19 mm.

Thus, in accordance with the present invention, a low profile inductive component is provided that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An inductive component for mounting on a printed circuit board comprising:

a low profile body having spaced apart legs extending from said body and defining an aperture extending through said body between said legs and soldering pads on the ends of said legs for electrically and mechanically attaching said body to lands on the printed circuit board;

a core having an end portion disposed in said aperture and an opposite end portion extending from said body between said legs; and a wire wound around said core having first and second ends electrically connected to respective soldering pads.

2. [An] *The* inductive component in accordance with claim 1, wherein said core is comprised of a magnetic material.

3. [An] *The* inductive component in accordance with claim 1, wherein said opposite end portion extends from said body between said legs to about the plane containing said soldering pads.

4. [An] *The* inductive component in accordance with claim 1, wherein said opposite end portion extends from said body between said legs to a point beyond the plane containing said soldering pads.

5. [An] *The* inductive component in accordance with claim 4, wherein said opposite end portion extends from said body between said legs and into an aperture in said printed circuit board in an amount no greater than the thickness of the printed circuit board.

6. [An] *The* inductive component in accordance with claim 1, wherein the core has a reduced diameter central section on which the wire is wound, a first flange which fits snugly in the aperture, a second flange of larger diameter than the first flange which is spaced from the surface of the body by spacers extending from the lower surface of said body.

7. [An] *The* inductive component in accordance with claim 6, wherein the spacers are of a height to position the second flange about even with the plane of the solder pads.

8. [An] *The* inductive component in accordance with claim 6, wherein the spacers are of a height to position the second flange beyond the plane of the solder pads.

9. A method of mounting a low profile inductive component on a printed circuit board, comprising the steps of:

providing a low profile body having spaced apart legs extending from said body and defining an aperture extending through said body between said legs, and soldering pads on the ends of said legs;

providing a core having an end portion disposed in said aperture and an opposite end portion extending from said body between said legs;

providing a wire wound around said core and having a first and second end, wherein said wire ends are connected to said soldering pads;

inserting said low profile inductive component on said printed circuit board such that said soldering pads abut lands on the printed circuit board; and soldering said soldering pads to said lands to electrically and mechanically attach said component to the lands.

10. The method of claim 9, wherein said core extends from said body between said legs and further comprise the step of inserting the extending core into the aperture in said printed circuit board.

11. The method of claim 10, wherein said core extends from said body between said legs and into said printed circuit board aperture an amount no greater than the thickness of the printed circuit board.

12. An inductive component for mounting on a printed circuit board comprising:

a low profile body having spaced apart soldering pads extending from said body for electrically and mechanically attaching said body to lands on the printed circuit board and defining an aperture extending through said body between said soldering pads;

a core having first and second flanged ends disposed in said aperture and extending from said body between said soldering pads; [and]

a wire wound around said core wherein said wire has a first and second end and wherein said wire ends are connected to said pads such that no portion of said wire is exposed externally when said inductive component is mounted on said printed circuit board*; and*

*the component has a height of less than about 1.65 mm.*

13. [An] *The* inductive component in accordance with claim 12, wherein said first flanged end is disposed in said aperture of said body such that said first flanged end and said body create a generally planar top surface.

14. [An] *The* inductive component in accordance with claim 13, wherein said second flanged end extends from said body between said soldering pads an amount no greater than the amount said solder pads extend from said body.

15. [An] *The* inductive component in accordance with claim 14, wherein said first flanged end is smaller in diameter than said second flanged end.

16. [An] *The* inductive component in accordance with claim 13, wherein said second flanged end extends from said body between said soldering pads an amount greater than the amount said solder pads extend from said body.

17. [An] *The* inductive component in accordance with claim 16, wherein said second flanged end extends from said body between said soldering pads and into an aperture in said printed circuit board an amount no greater than the thickness of the printed circuit board.

18. [An] *The* inductive component in accordance with claim 17, wherein said first flanged end is smaller in diameter than said second flanged end.

19. A method of making a low profile inductive component to be placed on a printed circuit board, wherein the method comprises:

providing a low profile body defining an aperture extending through said body and providing spaced apart soldering pads on said body adjacent said aperture;

providing a core;

wrapping a wire around said core so as to provide first and second ends;

inserting said core into said aperture; and electrically connecting said wire ends to respective soldering pads on said body *to form an assembled inductive component having a height of less than about 1.65 mm.*

20. A method of making a low profile inductive component to be placed on a printed circuit board, wherein the method comprises:

providing a low profile body having spaced apart [legs extending from said body] *soldering pads* and defining an aperture extending through said body between said [legs] *soldering pads, the body being made of at least one of a plastic or ceramic*;

[providing soldering pads on the ends of said legs;]

providing a core;

wrapping a wire *having first and second ends* around said core [so as to provide first and second ends];

inserting said core into said aperture; and electrically connecting said wire ends to respective soldering pads [on said legs].

21. An inductive component for mounting on a printed circuit board comprising:

a low profile body having spaced apart soldering pads on said body for electrically and mechanically attaching said body to lands on the printed circuit board and defining an aperture extending through said body between said soldering pads;

a core disposed in said aperture; and a wire wound around said core having first and second ends electrically connected to respective soldering pads.

22. [An] *The* inductive component in accordance with claim 21, wherein said core has first and second flanged ends, and said second flanged end extends from said body.

23. [An] *The* inductive component in accordance with claim 21, wherein said core has first and second flanged ends, and said second flanged end extends from said body beyond said soldering pads.

24. [An] *The* inductive component in accordance with claim 21, wherein said core has first and second flanged ends, and said second flanged end extends from said body an amount no greater than the amount said solder pads extend from said body.

*25. The inductive component in accordance with claim 21, wherein said core has first and second flanged ends.*

*26. The inductive component in accordance with claim 25, wherein said first flanged end is smaller in diameter than said second flanged end.*

*27. The inductive component in accordance with claim 26, wherein said first flanged end is disposed in said aperture above said second flanged end.*

*28. The inductive component in accordance with claim 26, wherein said inductive component is of a height range of about 1.1 mm to about 1.7 mm.*

*29. The inductive component in accordance with claim 21, wherein said inductive component has a height of less than about 1.65 mm.*

*30. A low profile inductive component for mounting on a printed circuit board comprising:*

*a low profile body defining an aperture extending therethrough and having spaced apart soldering pads for electrically and mechanically connecting the body to lands on the printed circuit board;*

*a core having first and second ends, wherein at least a portion of the core is disposed in the aperture of the body;*

*a wire wound around at least a portion of the core and having first and second ends connected to respective soldering pads; and*

*the component has a height of less than about 1.65 mm.*

*31. The inductive component in accordance with claim 30, wherein the first and second core ends comprise first and second flanged ends, respectively, and the core is disposed in the aperture such that an upper surface of the first flange end is flush with an upper surface of the body and a lower surface of the second flange end is flush with a lower surface of the body.*

*32. The inductive component in accordance with claim 31, wherein the upper flange end is smaller in diameter than the lower flange end.*

*33. The inductive component in accordance with claim 30, wherein the core ends comprise first and second flanged ends of different diameters.*

*34. The inductive component in accordance with claim 30, wherein the first core end is disposed in the aperture of the body and the second core end extends from the body.*

*35. The inductive component in accordance with claim 30, wherein the body further comprises spaced apart legs extending from the body and at least a portion of each spaced apart soldering pad is connected to at least one leg.*

*36. The inductive component in accordance with claim 35, wherein one of the first and second core ends extends from the body between the legs.*

*37. The inductive component in accordance with claim 30, wherein the soldering pads lie within a plane and at least one of the first and second core ends extends from the body beyond the plane containing the soldering pads.*

*38. The inductive component in accordance with claim 30, wherein the core has a reduced diameter central section on which the wire is wound, the first flange end is disposed in the aperture, and the second flange end is spaced from the body by spacers extending from a lower surface of the body.*

*39. The inductive component in accordance with claim 38, wherein the first and second flange ends are of different diameters.*

*40. A low profile inductive component for mounting on a printed circuit board comprising:*

*a low profile body defining an aperture extending therethrough and having spaced apart soldering pads for electrically and mechanically connecting the body to lands on the printed circuit board;*

*a core having first and second flange ends of different diameters, wherein at least a portion of the core is disposed in the aperture of the body; and*

*a wire wound around at least a portion of the core and having first and second ends connected to said soldering pads.*

*41. The inductive component in accordance with claim 40, wherein the assembled component has a height of less than about 1.65 mm.*

*42. The inductive component in accordance with claim 40, wherein the core is disposed in the aperture such that an upper surface of the first flange end is flush with an upper surface of the body and a lower surface of the second flange end is flush with a lower surface of the body.*

*43. The inductive component in accordance with claim 40, wherein the first flange end is disposed in the aperture of the body and the second flange end extends from the body.*

*44. The inductive component in accordance with claim 40, wherein the body further comprises spaced apart legs extending from the body and at least a portion of each spaced apart soldering pad is connected to at least one leg.*

*45. The inductive component in accordance with claim 44, wherein one of the first and second flange ends extends from the body between the legs.*

*46. The inductive component in accordance with claim 40, wherein the soldering pads lie within a plane and one of the first and second flange ends extends from the body beyond the plane containing the soldering pads.*

*47. The inductive component in accordance with claim 40, wherein the core has a reduced diameter central section on which the wire is wound, the first flange end is disposed in the aperture, and the second flange end is spaced from the body by spacers extending from a lower surface of the body.*

*48. An inductive component for mounting on a printed circuit board comprising:*

*a low profile body being made from at least one of a ceramic or plastic material and having spaced apart soldering pads connected to the body for electrically and mechanically attaching the body to lands on the printed circuit board and defining an aperture extending through the body between the soldering pads;*

*a core disposed in the aperture defined by the body; and*

*a wire wound around the core and having first and second wire ends connected to the soldering pads.*

*49. The inductive component in accordance with claim 48, wherein the core has first and second flanged ends and the first flanged end is disposed in the aperture of the body such that the first flanged end and the body create a generally planar top surface.*

*50. The inductive component in accordance with claim 49, wherein the second flanged end extends from the body between the soldering pads an amount no greater than the amount the solder pads extend from the body.*

*51. The inductive component in accordance with claim 49, wherein the first flanged end is smaller in diameter than the second flanged end.*

*52. The inductive component in accordance with claim 49, wherein the second flanged end extends from the body between the soldering pads an amount greater than the amount the solder pads extend from the body.*

*53. The inductive component in accordance with claim 52, wherein the second flanged end extends from the body between the soldering pads and into an aperture in the printed circuit board an amount no greater than the thickness of the printed circuit board.*

*54. The inductive component in accordance with claim 52, wherein the first flanged end is smaller in diameter than the second flanged end.*

*55. The inductive component in accordance with claim 48, wherein the assembled component has a height of less than about 1.65 mm.*

* * * * *